US011802200B2

(12) United States Patent
Shethji et al.

(10) Patent No.: US 11,802,200 B2
(45) Date of Patent: *Oct. 31, 2023

(54) ISOPOROUS SELF-ASSEMBLED BLOCK COPOLYMER FILMS CONTAINING HIGH MOLECULAR WEIGHT HYDROPHILIC ADDITIVES AND METHODS OF MAKING THE SAME

(71) Applicant: TeraPore Technologies, Inc., South San Francisco, CA (US)

(72) Inventors: Jayraj K. Shethji, San Francisco, CA (US); Rachel M. Dorin, San Francisco, CA (US); Spencer Robbins, San Francisco, CA (US)

(73) Assignee: TeraPore Technologies, Inc., South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/731,054

(22) Filed: Apr. 27, 2022

(65) Prior Publication Data
US 2022/0251366 A1 Aug. 11, 2022

Related U.S. Application Data

(63) Continuation of application No. 16/461,130, filed as application No. PCT/US2017/061278 on Nov. 13, 2017, now Pat. No. 11,401,411.
(Continued)

(51) Int. Cl.
*C08L 53/00* (2006.01)
*C08L 39/06* (2006.01)
(Continued)

(52) U.S. Cl.
CPC ........ *C08L 53/005* (2013.01); *B01D 67/0011* (2013.01); *B01D 67/0016* (2013.01);
(Continued)

(58) Field of Classification Search
CPC .... C08L 53/005; C08L 39/06; C08L 2203/16; C08L 53/00; C08L 101/00;
(Continued)

(56) References Cited

U.S. PATENT DOCUMENTS 3,673,272 A 6/1972 Dean
4,014,798 A 3/1977 Rembaum
(Continued)

FOREIGN PATENT DOCUMENTS

CA 2886437 A1 5/2014
CA 3022510 A1 11/2017
(Continued)

OTHER PUBLICATIONS

N. Lefèvre et al., "Self-Assembly in Thin Films of Mixtures of Block Copolymers and Homopolymers Interacting by Hydrogen Bonds." Macromolecules, vol. 43, No. 18, pp. 7734-7743, Aug. 17, 2010.
(Continued)

*Primary Examiner* — John Kim
(74) *Attorney, Agent, or Firm* — Johnson, Marcou, Isaacs & Nix, LLC

(57) ABSTRACT

The invention provides systems and methods for substantially improving the compaction resistance of isoporous block copolymer (BCP) film by adding a high molecular weight hydrophilic additive in the casting dope formulation. Systems and methods disclosed also disclose several other multifunctional enhancements to film properties including: low fouling propensity, improved permeability, improved permeability retention upon drying, and ability to tune the substructure and pore size of these novel BCP films. These porous BCP films are useful in filtration and separations applications and are amenable to standard manufacturing practices.

17 Claims, 13 Drawing Sheets

Related U.S. Application Data

(60) Provisional application No. 62/423,294, filed on Nov. 17, 2016.

(51) Int. Cl.

| | | |
|---|---|---|
| *C08J 9/00* | (2006.01) | |
| *B01D 67/00* | (2006.01) | |
| *B01D 71/80* | (2006.01) | |
| *B01D 69/06* | (2006.01) | |
| *B29C 39/00* | (2006.01) | |
| *C08J 9/28* | (2006.01) | |
| *C08J 9/10* | (2006.01) | |
| *C08L 101/00* | (2006.01) | |
| *C08J 9/26* | (2006.01) | |
| *C08J 5/18* | (2006.01) | |
| *B01D 71/26* | (2006.01) | |
| *B29D 7/01* | (2006.01) | |
| *B01D 71/28* | (2006.01) | |
| *B01D 71/40* | (2006.01) | |

(52) U.S. Cl.
CPC ............ *B01D 71/26* (2013.01); *B01D 71/80* (2013.01); *B29C 39/003* (2013.01); *B29D 7/01* (2013.01); *C08J 5/18* (2013.01); *C08J 9/00* (2013.01); *C08J 9/10* (2013.01); *C08J 9/26* (2013.01); *C08J 9/28* (2013.01); *C08L 39/06* (2013.01); *C08L 53/00* (2013.01); *C08L 101/00* (2013.01); *B01D 69/06* (2013.01); *B01D 71/28* (2013.01); *B01D 71/40* (2013.01); *B01D 2323/02* (2013.01); *B01D 2325/021* (2013.01); *B29K 2039/06* (2013.01); *C08L 2203/16* (2013.01)

(58) Field of Classification Search
CPC ............ B01D 67/0011; B01D 67/0016; B01D 69/06; B01D 71/26; B01D 71/28; B01D 71/40; B01D 71/80; B01D 2323/02; B01D 2325/021; B23C 39/003; B29K 2039/06; B29D 7/01; C08J 5/18; C08J 9/00; C08J 9/10; C08J 9/26; C08J 9/28
See application file for complete search history.

(56) References Cited

U.S. PATENT DOCUMENTS

| | | | |
|---|---|---|---|
| 4,399,035 A | 8/1983 | Nohmi et al. | |
| 4,666,991 A | 5/1987 | Matsui et al. | |
| 4,720,343 A | 1/1988 | Walch et al. | |
| 4,880,441 A | 11/1989 | Kesting et al. | |
| 5,114,585 A | 5/1992 | Kraus et al. | |
| 5,130,024 A | 7/1992 | Fujimoto et al. | |
| 5,158,721 A | 10/1992 | Allegrezza et al. | |
| 5,647,989 A | 7/1997 | Hayashi et al. | |
| 5,700,902 A | 12/1997 | Hancock et al. | |
| 5,700,903 A | 12/1997 | Hancock et al. | |
| 5,792,227 A | 8/1998 | Kahlbaugh et al. | |
| 5,805,425 A | 9/1998 | Peterson | |
| 5,907,017 A | 5/1999 | Ober et al. | |
| 5,928,792 A | 7/1999 | Moya | |
| 6,033,370 A | 3/2000 | Reinbold et al. | |
| 6,241,886 B1 | 6/2001 | Kitagawa et al. | |
| 6,354,443 B1 | 3/2002 | Moya | |
| 6,379,796 B1 | 4/2002 | Uenishi et al. | |
| 6,503,958 B2 | 1/2003 | Hughes et al. | |
| 6,565,782 B1 | 5/2003 | Wang et al. | |
| 6,592,764 B1 | 7/2003 | Stucky et al. | |
| 6,592,991 B1 | 7/2003 | Wiesner et al. | |
| 6,663,584 B2 | 12/2003 | Griesbach, III et al. | |
| 7,056,455 B2 | 6/2006 | Matyjaszewski et al. | |
| 7,438,193 B2 | 10/2008 | Yang et al. | |
| 7,927,810 B2 | 4/2011 | Togawa et al. | |
| 8,025,960 B2 | 9/2011 | Dubrow et al. | |
| 8,147,685 B2 | 4/2012 | Pritchard | |
| 8,206,601 B2 | 6/2012 | Bosworth et al. | |
| 8,294,139 B2 | 10/2012 | Marsh et al. | |
| 8,939,294 B2 | 1/2015 | Moore et al. | |
| 9,162,189 B1 | 10/2015 | Aamer et al. | |
| 9,169,361 B1 | 10/2015 | Aamer | |
| 9,193,835 B1 | 11/2015 | Aamer | |
| 9,441,078 B2 | 9/2016 | Aamer | |
| 9,469,733 B2 | 10/2016 | Aamer et al. | |
| 9,527,041 B2 | 12/2016 | Wiesner et al. | |
| 10,711,111 B2 | 7/2020 | Wiesner et al. | |
| 10,912,868 B2 | 2/2021 | Ushiro et al. | |
| 2003/0073158 A1 | 4/2003 | Ma | |
| 2003/0171560 A1 | 9/2003 | Peters | |
| 2003/0226818 A1 | 12/2003 | Dunbar et al. | |
| 2004/0065607 A1 | 4/2004 | Wang et al. | |
| 2004/0122388 A1 | 6/2004 | McCormack et al. | |
| 2004/0126778 A1 | 7/2004 | Lemmens et al. | |
| 2004/0129678 A1 | 7/2004 | Crowley et al. | |
| 2004/0138323 A1 | 7/2004 | Stenzel-Rosebaum et al. | |
| 2004/0242822 A1 | 12/2004 | Gawrisch et al. | |
| 2006/0014902 A1 | 1/2006 | Mays et al. | |
| 2006/0085062 A1 | 4/2006 | Lee et al. | |
| 2006/0094598 A1 | 5/2006 | Simon | |
| 2006/0151374 A1 | 7/2006 | Wu et al. | |
| 2006/0283092 A1 | 12/2006 | Chinone | |
| 2007/0029256 A1 | 2/2007 | Nakano et al. | |
| 2007/0265174 A1 | 11/2007 | Schlenoff | |
| 2007/0287241 A1 | 12/2007 | Takahashi et al. | |
| 2008/0097271 A1 | 4/2008 | Lo et al. | |
| 2008/0193818 A1 | 8/2008 | Mays | |
| 2008/0261255 A1 | 10/2008 | Tolosa et al. | |
| 2009/0173694 A1 | 7/2009 | Peinemann et al. | |
| 2009/0181315 A1 | 7/2009 | Spatz et al. | |
| 2009/0208726 A1 | 8/2009 | Yang et al. | |
| 2009/0209726 A1 | 8/2009 | Matsumoto et al. | |
| 2009/0239381 A1 | 9/2009 | Nishimi et al. | |
| 2010/0051546 A1 | 3/2010 | Vuong et al. | |
| 2010/0108599 A1 | 5/2010 | Vizvardi et al. | |
| 2010/0167271 A1 | 7/2010 | Ryan | |
| 2010/0181288 A1 | 7/2010 | Tang et al. | |
| 2010/0219383 A1 | 9/2010 | Eklund | |
| 2010/0224555 A1 | 9/2010 | Hoek et al. | |
| 2011/0130478 A1 | 6/2011 | Warren et al. | |
| 2011/0240550 A1 | 10/2011 | Moore et al. | |
| 2011/0275077 A1 | 11/2011 | James et al. | |
| 2012/0048799 A1 | 3/2012 | Na et al. | |
| 2012/0318741 A1 | 12/2012 | Peinemann et al. | |
| 2013/0053748 A1 | 2/2013 | Cotton | |
| 2013/0112613 A1 | 5/2013 | Kang et al. | |
| 2013/0129972 A1 | 5/2013 | Ting | |
| 2013/0193075 A1 | 8/2013 | Liang et al. | |
| 2013/0344375 A1 | 12/2013 | Brant et al. | |
| 2014/0005364 A1 | 1/2014 | Gottschall et al. | |
| 2014/0217012 A1 | 8/2014 | Wiesner et al. | |
| 2014/0363572 A1 | 12/2014 | Moll et al. | |
| 2014/0371698 A1 | 12/2014 | Chang et al. | |
| 2015/0151256 A1 | 6/2015 | Abetz et al. | |
| 2015/0336058 A1 | 11/2015 | Hillmyer et al. | |
| 2015/0343395 A1 | 12/2015 | Aamer et al. | |
| 2015/0343398 A1 | 12/2015 | Aamer et al. | |
| 2016/0023171 A1 | 1/2016 | Phillip et al. | |
| 2016/0229969 A1 | 8/2016 | Wiesner et al. | |
| 2016/0288062 A1 | 10/2016 | Ait-Haddou et al. | |
| 2016/0319158 A1 | 11/2016 | Fleury et al. | |
| 2016/0375409 A1 | 12/2016 | Stasiak et al. | |
| 2017/0022337 A1 | 1/2017 | Wiesner et al. | |
| 2017/0105877 A1 | 4/2017 | Buteux et al. | |
| 2017/0327649 A1 | 11/2017 | Wiesner et al. | |
| 2018/0043314 A1 | 2/2018 | Onyemauwa et al. | |
| 2018/0043656 A1 | 2/2018 | Song et al. | |
| 2019/0233307 A1 | 8/2019 | Fujimura et al. | |
| 2020/0238227 A1 | 7/2020 | Dorin et al. | |

(56) References Cited

U.S. PATENT DOCUMENTS

| | | |
|---|---|---|
| 2020/0339770 A1 | 10/2020 | Wiesner et al. |
| 2021/0040281 A1 | 2/2021 | Dorin et al. |

FOREIGN PATENT DOCUMENTS

| | | |
|---|---|---|
| CN | 201211329 Y | 3/2009 |
| CN | 101460203 A | 6/2009 |
| CN | 101516481 A | 8/2009 |
| CN | 101969902 A | 2/2011 |
| CN | 102224163 A | 10/2011 |
| CN | 102892486 A | 1/2013 |
| CN | 103797053 A | 5/2014 |
| CN | 104159657 A | 11/2014 |
| CN | 104768506 A | 7/2015 |
| CN | 105273211 A | 1/2016 |
| CN | 105536580 A | 5/2016 |
| CN | 106344539 A | 1/2017 |
| DE | 10 2012 207 338 A1 | 11/2013 |
| DE | 102014213027 A1 | 1/2016 |
| EP | 2160946 A1 | 3/2010 |
| EP | 2703016 A1 | 3/2014 |
| EP | 2705077 A2 | 3/2014 |
| EP | 2977101 A1 | 1/2016 |
| EP | 3 056 260 A1 | 8/2016 |
| EP | 3284529 A1 | 2/2018 |
| EP | 3541500 A1 | 9/2019 |
| EP | 3544720 A1 | 10/2019 |
| EP | 3658262 A1 | 6/2020 |
| FR | 3037071 A1 | 12/2016 |
| JP | 54-145766 A | 11/1979 |
| JP | H04-22428 A | 1/1992 |
| JP | 09-048861 A | 2/1997 |
| JP | 2002-537422 A | 11/2002 |
| JP | 2005-500132 A | 1/2005 |
| JP | 2006-175207 A | 7/2006 |
| JP | 2011-117956 A | 6/2011 |
| JP | 2011-131208 A | 7/2011 |
| JP | 2011-189229 A | 9/2011 |
| JP | 2012-246162 A | 12/2012 |
| JP | 2015-083299 A | 4/2015 |
| JP | 2015-167914 A | 9/2015 |
| JP | 2016-514049 A | 5/2016 |
| JP | 2016-526089 A | 9/2016 |
| JP | 2017-153616 A | 9/2017 |
| JP | 2018-500401 A | 1/2018 |
| JP | 2019-514687 A | 6/2019 |
| KR | 10-2009-0088124 A | 8/2009 |
| KR | 10-2012-0047269 A | 5/2012 |
| KR | 10-2012-0124412 A | 11/2012 |
| KR | 2012-0124412 A | 11/2012 |
| KR | 10-2016-0020404 A | 2/2016 |
| KR | 10-2018-0019059 A | 2/2018 |
| SG | 10201706492V A | 3/2018 |
| SG | 11201904425 Y | 6/2019 |
| SG | 11202000664Y A | 2/2020 |
| WO | 2005/082501 A1 | 9/2005 |
| WO | 2005/091755 A2 | 10/2005 |
| WO | 2008/034487 A1 | 3/2008 |
| WO | 2010/051150 A1 | 5/2010 |
| WO | WO 2011/098851 A1 | 8/2011 |
| WO | 2011/111679 A1 | 9/2011 |
| WO | 2011/123033 A1 | 10/2011 |
| WO | 2012/151482 A2 | 11/2012 |
| WO | 2014/164793 A2 | 10/2014 |
| WO | WO 2015/048244 A1 | 4/2015 |
| WO | WO 2015/168409 A1 | 11/2015 |
| WO | 2015/188225 A1 | 12/2015 |
| WO | 2016/023765 A1 | 2/2016 |
| WO | 2016/031834 A1 | 3/2016 |
| WO | 2016/066661 A1 | 5/2016 |
| WO | 2017/189697 A1 | 11/2017 |
| WO | 2018/043209 A1 | 3/2018 |
| WO | 2018/055801 A1 | 3/2018 |
| WO | 2018/093714 A1 | 5/2018 |
| WO | 2018/097988 A1 | 5/2018 |
| WO | 2019/023135 A1 | 1/2019 |
| WO | 2019/178045 A1 | 9/2019 |
| WO | 2019/178077 A1 | 9/2019 |
| WO | 2019/195396 A1 | 10/2019 |

OTHER PUBLICATIONS

J. Suzuki et al., "Morphology of ABC Triblock Co polymer/Homopolymer Blend Systems." Journal of Polymer Science Part B: Polymer Physics, vol. 40, pp. 1135-1141, Apr. 22, 2002.

A Bruil et al., "The Mechanisms of Leukocyte Removal by Filtration." Transfusion Medicine Reviews vol. IX No. 2, pp. 145-166, Apr. 1995.

A. A. Shukla et al., "Recent Advances in Large-Scale Production of Monoclonal Antibodies and Related Proteins." Trends in Biotechnology, vol. 28, No. 5, pp. 253-261, 2010.

A S. Devonshire et al., "Towards Standardisation of Cell-Free DNA Measurement in Plasma: Controls for Extraction Efficiency, Fragment Size Bias and Quantification." Anal. Bioanal. Chem., vol. 406, pp. 6499-6512, 2014.

Behler, Ansgar (Edited by), "Poren," Rompp Verlag, Rompp online 4.0, Aug. 2005, retrieved from Internet: URL: https://roempp.thieme.de/roempp4.0/do/data/RD-16-03734.

Breiner et al, "Structural Characterization of the "Knitting Pattern" in Polystyrene-block-poly(ethylene-co-butylene)-block-poly(methyl methacrylate) Triblock Copolymers", Macromolecules 1998, 31, 135-141.

Clodt et al., "Performance study of isoporous membranes with tailored pore sizes", Journal of Membrane Science, vol. 495, Jul. 29, 2015, pp. 334-340.

D. Keskin, et al., "Postmodification of PS-b-P4VP Diblock Copolymer Membranes by ARGET ATRP." Langmuir, vol. 30, pp. 8907-8914, Jun. 19, 2014.

Dai et al., "Fabrication of 2D ordered structure of self-assembled block copolymers containing gold nanoparticles," Journal of Crystal Growth, vol. 288, No. 1, pp. 128-136, Feb. 2, 2006.

Doan Minh Y Nhi, "Investigation of the Effects of UV-Crosslinking on Isoporous Membrane Stability." KTH Chemical Science and Engineering, pp. 1-46, 2011.

E. Gifford et al., "Sensitivity Control of Optical Fiber Biosensors Utilizing Turnaround Point Long Period Gratings with Self-Assembled Polymer Coatings." Proceedings of the SPIE, vol. 6659 pp. 66590D-1-66590D-9, Sep. 30, 2007.

F. A. Carey, Omanic Chemistry, Fifth Edition, pp. 859-860, 2003.

Fink, Johannes Karl. Handbook of Engineering and Specialty Thermoplastics. 2011. vol. 2, Water Soluble Polymers. Chapter 7. p. 189-192. (Year: 2011).

H. Ahlbrecht et al., "Stereoselective synthesis. Methods of Organic Chemistry." Houben-Weyl, vol. E 21 a, 4th Edition Supplement, 1995.

H. Sai et al., "Hierarchical Porous Polymer Scaffolds from Block Copolymers." Science, vol. 341, pp. 530-533, Aug. 2, 2013.

Hanselmann, Blockcopolymere, ROMPP Online, Version 3.37, Dokumentkennung RD-02-02007. Jul. 1, 2009.

Hilke et al., "Block copolymer/homopolymer dual-layer hollow fiber membranes", Journal of Membrane Science, vol. 472, Aug. 23, 2014, pp. 39-44.

Hoek et al., Physical-chemical properties, separation performance, and fouling resistance of mixed-matrix ultrafiltration member, Desalination, Elsevier, vol. 283, pp. 89-99. May 4, 2011.

Huang Yan et al: "Highly Ordered Mesoporous Carbonaceous Frameworks from a Template of a Mixed Amphiphilic Triblock-Copolymer System of PEO-PPO-PEO and Reverse Ppo-Peo-Ppo", Chemistry—An Asian Journal, vol. 2, No. 10, Oct. 1, 2007 (Oct. 1, 2007), pp. 1282-1289.

J. I. Clodt et al., "Carbohydrates as Additives for the Formation of Isoporous PS-b-P4VP Diblock Copolymer Membranes" Macromolecular Rapid Communications, vol. 34, 190-194, 2013.

Julie N.L. Albert et al. "Self-assembly of block copolymer thin films", Materialstoday, vol. 13, is. 6, Jun. 2010, pp. 24-33.

(56) References Cited

OTHER PUBLICATIONS

Jung et al., Structure Formation of Integral Asymmetric Composite Membranes of Polystyrene-block-Poly(2-vinylpuridine) on a Nonwoven, Macromolecular Materials and Engineering, vol. 297, No. 8, pp. 790-798. Feb. 9, 2012.

Kanegsberg, "Washing, Rinsing, and Drying: Items to Consider for the Optimization of Your Cleaning Process," https://www.materialstoday.com/metal-finishing/features/washing-rinsing-and-drying-items-to-consider-for/, Sep. 1, 2005. p. 2, paragraph 6.

Karunakaran et al. "IsoporousIPS-b-PEO ultrafiltration membranes via self-assembly and water-induced phase separatioln" Journal of Membrane Science, vol. 453 Issue 1 (Nov. 16, 2013): pp. 471-477.

Khademi, M. Application of Tubular Crssflow Microfiltration in Harvesting Microalgae. LSU Master's Theses. 2014, pp. 39-43.

Kharitonov et al., "Surface modification of polymers by direct fluorination: A convenient approach to improve commercial properties of polymeric articles," Pure Appl. Chem., vol. 81, No. 3, pp. 451-471, 2009.

Laboratory-Equipment.com, "Applications for Laboratory Ovens Across the Sciences." https://www.laboratory-equipment.com/blog/all-laboratory-equipment-blogs/applications-for-laboratory-ovens-across-the-sciences/, Oct. 15, 2015, p. 1, section "Standard and Specialized Lab Oven Applications".

Lawrence E. Nielsen, "Cross-Linking-Effect on Physical Properties of Polymers." Journal of Marcomolecular Science Part C, vol. 3(1), pp. 69-103, 2008.

Li Yuk Mun et al: "Asymmetric Membranes from Two Chemically Distinct Triblock Terpolymers Blended during Standard Membrane Fabrication", Macromolecular Rapid Communications, vol. 37, No. 20, Oct. 1, 2016 (Oct. 1, 2016), pp. 1689-1693.

Lubomir et al., "Deposition of polymeric perfluored thin films in proton ionic membranes by plasma processes," Applied Surface Science, vol. 254, pp. 173-176, 2007.

Mu X. et al., Nano-porous Nitrocellulose Liquid Bandage Modulates Cell and Cytokine Response and Accelerates Cutaneous Wound Healing in a Mouse Model. Carbohydr Polym., Sep. 25, 2015, vol. 136, pp. 618-629.

Parul Jain et.al., "Protein purification with polymeric affinity membranes containing functionalized poly (acid) brushes", Biomacromolecules, 2010, vol. 11, No. 4, 1019-1026.

Peinemann et al, "Asymmetric superstructure formed in a block copolymer via phase separation", Nature Materials, V6, Dec. 2007, pp. 992-996.

Phillip, W., et al., Tuning Structure and Properties of Graded Triblock Terpolymer-Based Mesoporous and Hybrid Films, Nano Letters, Jun. 7, 2011, Nov. 11, pp. 2892-2900.

Qiu et al. "Selective Separation of Similarly Sized Proteins with Tunable Nanoporous Block Copolymer Membranes." ACS Nano. vol. 7, No. 1, 2013. p. 768-776 (Year: 2013).

R. van Reis et al., "High Performance Tangential Flow Filtration." Biotechnology and Bioengineering, vol. 56, No. 1, pp. 71-82, Oct. 5, 1997.

Radjabian, Polymer, 55 (2014), 2986-2997 (Year: 2014).

Ren et al, J. Am. Chem. Soc, 1998, 120, 6830-6831 (Year: 1998).

Roland et al., "Supplementary Information Block Copolymer/Homopolymer Dual-Layer Hollow Fiber Membranes Imaging and Characterization Lab and c Water Desalination", Aug. 23, 2014, pp. 1-3.

S. Breitbach et al., "Direct Quantification of Cell-Free, Circulating DNA from Unpurified Plasma." PLoS One, vol. 9, Issue 3, e87838 pp. 1-11, (2014).

S. P. Nunes et al., "From Micelle Supramolecular Assemblies in Selective Solvents to Isoporous Membranes." Langmuir, DOI 10.1021/la201439P, Jun. 28, 2011.

S. Rangou et al., "Self-Organized Isoporous Membranes with Tailored Pore Sizes." Journal of Membrane Science, vol. 451, pp. 266-275, 2014.

Shahkaramipour et al., "Membranes with Surface-Enhanced Antifouling Properties for Water Purification," Membranes, vol. 7, pp. 13, 2017.

Tiraferri et al., Binding Silver and Silica Nanoparticles to Polymeric Membrane Surfaces for Novel Anti-Biofouling Properties, ACS Division Proceedings, Division of Polymer Chemistry, Meeting 242, Aug. 28-Sep. 1, 2011, Denver, CO, USA. Sep. 1, 2011.

Volker Abetz "Isoporous Block Copolmer membranes", Macromolecular Rapid Communications, vol. 36, No. 1, Nov. 29, 2014 (Nov. 29, 2014), pp. 10-22.

Wang Zhaogen et al: "Isoporous membranes with gradient porosity by selective swelling of UV-crosslinked block copolymers", Journal of Membrane Science, vol. 476, Feb. 1, 2015 (Feb. 1, 2015), pp. 449-456.

Y Nhi et al., "Investigation of the Effect of UV-Crosslin King on Isoporous Membrane Stability", Chemical Science and Engineering, vol. 46, Dec. 12, 2011.

Yizhou Zhang et al: "Nanoporous membranes generated from self-assembled block polymer precursors: Quo Vadis?", Journal of Applied Polymer Science, vol. 132, No. 21, Jun. 5, 2015.

Yizhou Zhang, et al., "Microfiltration and Ultrafiltration Membrane Science and Technology". Journal of Applied Polymer Science, app. 41683, on. 1-17, 2015.

Young et al., Robert J., Introduction to Polymers, Third Edition, CRC Press 2011, pp. 6-9 and 456-457.

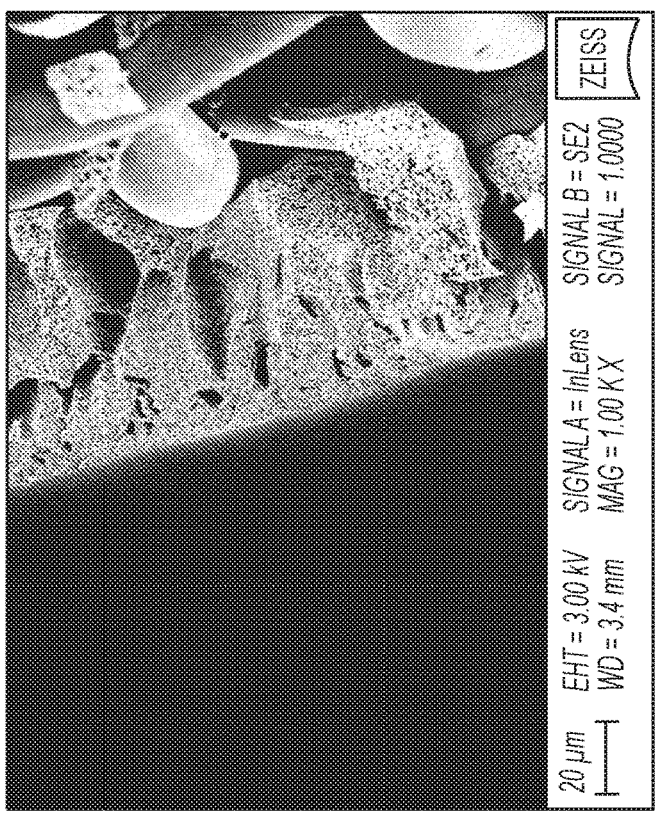
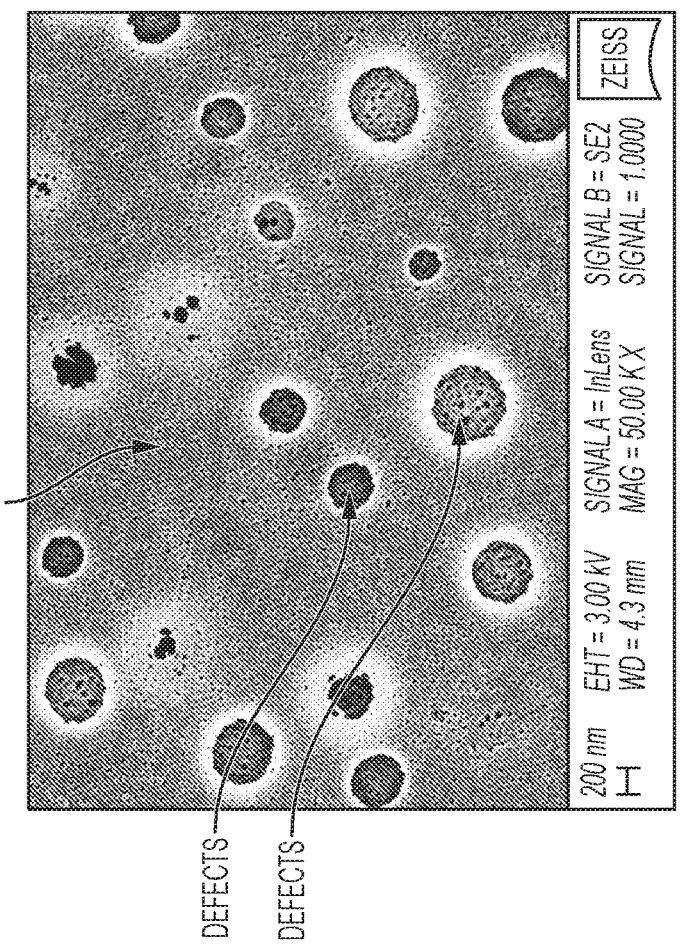
FIGURE 2A

FIGURE 3
NEAT ISV28
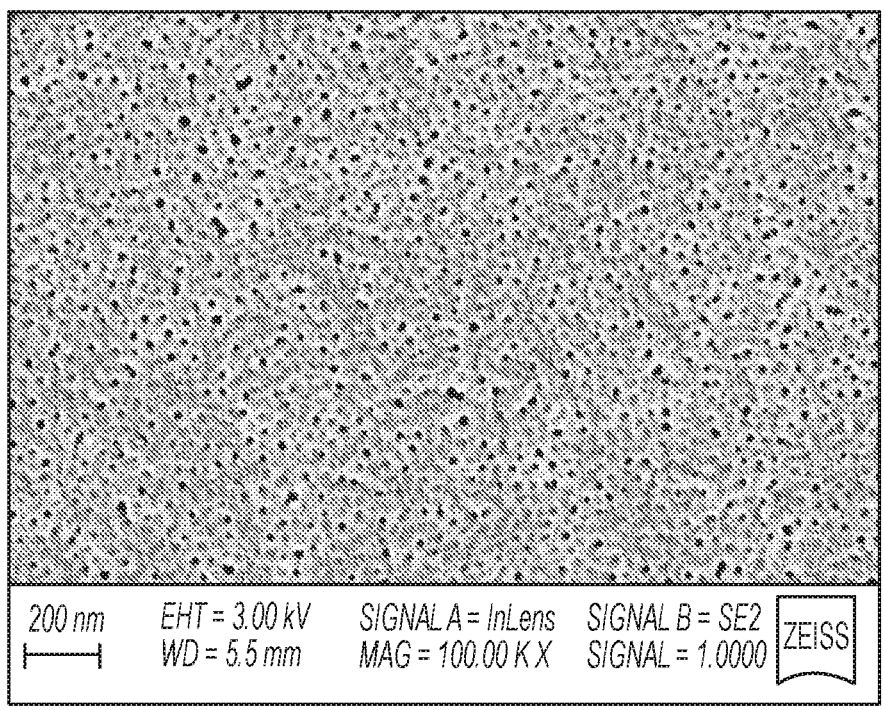
ISV28+5%K90 IN DOX/THF
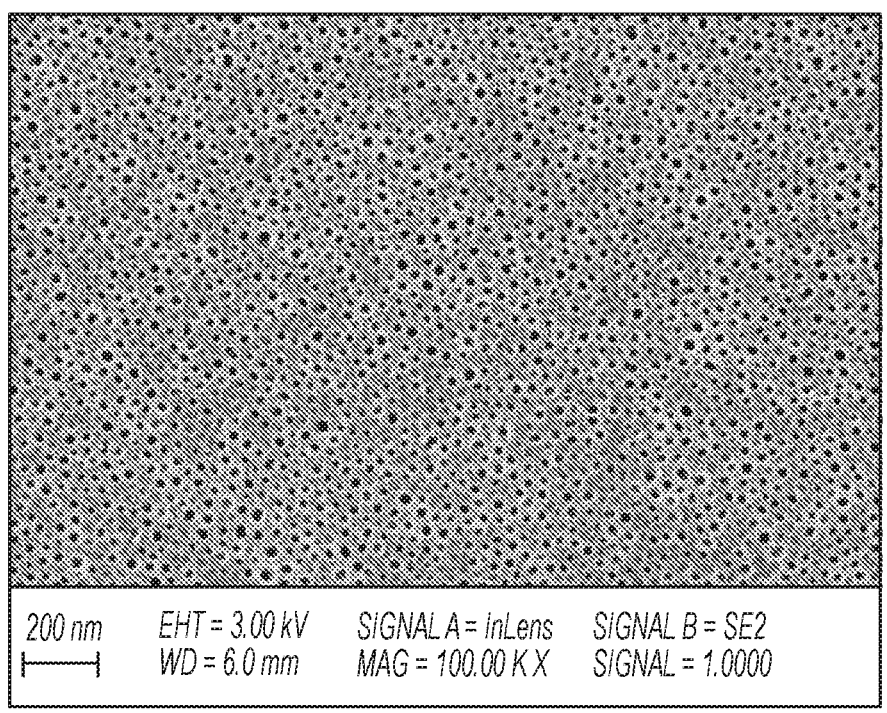

ISV28+5%K90 IN DOX/Ace

ABOVE IMAGES SHOWS THE TOP SURFACE OF ISV MEMBRANES WITH AND WITHOUT THE HIGH MOLECULAR WEIGHT ADDITIVE IN DIFFERENT SOLVENT SYSTEMS. THESE IMAGES CLEARLY SHOWS THAT THE SELF ASSEMBLY WAS NOT DISRUPTED AFTER ADDING HIGH MOLECULAR WEIGHT PVP K90 IN THE CASTING DOPE.

FIGURE 5

| CONSTITUENTS | SOLVENT SYSTEM | MEMBRANE ID | FLUX, LMH/Bar | FLUX DECLINE, % |
|---|---|---|---|---|
| PISV28+1.2%K90 | DOX/Ace | L160712JS-1 | 242 | 0.3 |
| | | L160712JS-3 | 287 | -3 |
| ISV28+5%K90 | DOX/THF | L160602JS-4A | 633.8 | 30 |
| | | L160520JS-1A | 446 | 5 |
| | | L160520JS-1B | 453 | 21 |
| | | L160520JS-3A | 420 | 23 |
| | | L160520JS-3B | 455 | 12 |
| PISV22+5%PVPK90 | DOX/Ace | L160706JS-1 | 223 | 15 |
| | | L160706JS-2 | 211 | 5 |
| PISV28+5%PVPK90 | | L160706JS-4 | 252 | 11 |
| | | L160706JS-5 | 175 | 8 |
| | | L160729JS-1 | 400 | 34 |
| PISV29+0.5%PVPK90 | | L160719JS-1 | 311 | 8 |
| ISV28+1.3%KK90 | DOX/Ace | L160719JS-2 | 291 | 18 |
| | | L160719JS-3 | 259 | 9 |
| | | L160719JS-4 | 440 | 10 |

ISOPOROUS SELF-ASSEMBLED BLOCK COPOLYMER FILMS CONTAINING HIGH MOLECULAR WEIGHT HYDROPHILIC ADDITIVES AND METHODS OF MAKING THE SAME

CROSS-REFERENCE TO RELATED APPLICATIONS

This application is a continuation of co-pending U.S. patent application Ser. No. 16/461,130, filed May 15, 2019, now U.S. Pat. No. 11,401,411. U.S. patent application Ser. No. 16/461,130 is the 35 U.S.C. § 371 national stage application of PCT Application No. PCT/US2017/061278, filed Nov. 13, 2017, where the PCT claims priority to, and the benefit of, U.S. Provisional Application No. 62/423,294, filed Nov. 17, 2016. U.S. patent application Ser. No. 16/461,130, PCT Application No. PCT/US2017/061278, and U.S. Provisional Application No. 62/423,294 are herein incorporated by reference in their entireties.

FIELD OF THE INVENTION

The invention relates to isoporous block copolymer ("BCP") films and methods for fabricating the same.

BACKGROUND OF THE INVENTION

Membrane fouling and membrane compaction are two prime causes of flux degradation in membrane filtration processes. Membrane fouling is a commonly known hindrance to membrane performance. It occurs when a solution or particulate matter is deposited on a membrane during use. Membrane fouling results in the degradation of membrane performance. Membrane fouling mechanisms are well-understood and the flux degradation by fouling can be fully recovered in many filtration applications by designing fouling resistant membranes, process improvements, and clean-in-place techniques.

Unlike membrane fouling, which is in many applications reversible, membrane compaction results in non-reversible flux degradation and irreversible change in the porous substructure of the membrane. Membrane compaction thus affects filtration selectivity. Membrane compaction is a deformation of the membrane caused by the pressure differential across the membrane during use. When a membrane is exposed to high pressure differentials, the flux of water and dissolved constituents decrease through the membrane over time. In order to maintain flux, larger pressure differentials must be applied, resulting in even higher stress in the porous regions, which may result in a reorganization of polymers that increases the density of the material. Additionally, physical compaction decreases the overall porosity of the membrane and can therefore exacerbate membrane fouling. Membrane compaction is a difficult problem to overcome because the applied feed pressure needs to be increased over time, in order to maintain the same throughput. All this results in increased capital expenditure vs. operating expense ("CAPEX/OPEX") for a business, cutting into profits, due to higher energy demand and a shortening in the useful life of the membrane.

Preexisting membrane technologies utilize block copolymer (BCP) membranes based on such triblock polymers such as poly(isoprene-b-styrene-b-4-vinyl-pyridine) ("ISV"). Such a BCP membrane is disclosed in WO 2012/151482 A3, which describes the fabrication of such membranes through a combination of controlled solvent evaporation and well-established immersion precipitation processes. However, akin to membranes fabricated from conventional polymers, the BCP membranes produced from neat ISV polymers are also susceptible to physical compaction.

U.S. Patent Application 2010/0224555 A1 ("Hoek et at") discloses other membranes designed to resist compaction. The application teaches that membrane compaction can be improved by incorporating nanoparticles in the polymer matrix. The reference discloses that the inclusion of these nanoparticles improves the stiffness and toughness of the membrane material, and hence its ability to preserve its porous structure and resist physical compaction. However, incorporating nanoparticles into the block copolymer matrix of a membrane tends to disrupt the ordered self-assembly of microphase separated domains. Moreover, the addition of any foreign additives (e.g. nanoparticles, pore forming agents) to the casting dope formulation to fabricate BCP membranes is complex, and not as straightforward as with membranes produced from conventional polymers. One of the unique advantage of ISV polymers is their ability to self-assemble and form uniformly sized micelles in the casting solution, which in turn, provides a highly ordered isoporous structure on the membrane's surface. The highly ordered uniformly sized pores give a very sharp molecular weight cut-off and provide excellent selectivity for separating molecules of differing size. In light of this, preserving the self-assembled structure of the membrane is of utmost importance. Hoek et al.'s disclosure therefore does not resolve the membrane compaction problems existing in the art.

In order to resolve those and other deficiencies in the art, the present invention is directed to BCP membranes that are resistant to compaction while maintaining a high level of selectivity in the separation of molecules. Methods for the fabrication of such membranes are also disclosed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 2A and 2B show microscopic scans of BCP membranes with and without the incorporation of the high molecular weight additive, polyethylene glycol (PEG-150K);

FIG. 5 shows a table of flux decline percentages for BCP films embodying the present invention;

FIG. 7B shows a graph of the film selectivity of a BCP film incorporating PVP-K90 between 7 nm and 20 nm; Arrows indicate which axis the data points correspond to.

DETAILED DESCRIPTION OF THE PREFERRED EMBODIMENTS

Figure 1:
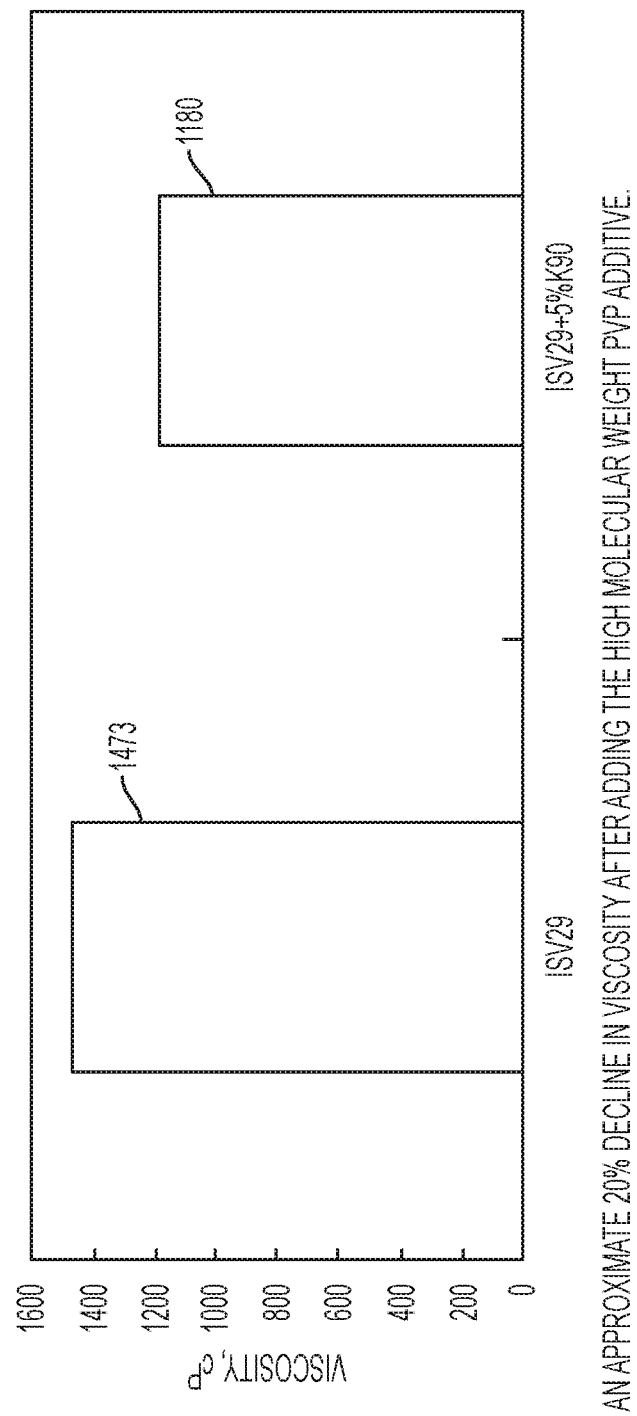
FIG. 1 shows a comparison of viscosities in BCP films formed with only ISV29 versus BCP films formed with ISV29 and 5% PVP-K90.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose. Several preferred embodiments of the invention are described for illustrative purposes, it being understood that the invention may be embodied in other forms not specifically shown in the drawings. In some embodiments, the films are membranes, which are a subset of films. In the context of the invention, "high molecular weight" is defined as being equal to or greater than 50% of the molecular weight of the majority block copolymer comprising the material of the invention. The films have mesopores, defined as about between 1 nm and 200 nm. In the context of the invention, isoporous means having a substantially narrow pore diameter distribution. The films are either symmetric or asymmetric.

In films fabricated from conventional polymers, poly(vinylpyrrolidone) (PVP) of different molecular weights are added in the film casting solution to improve the water flux, hydrophilicity, tune the pore size and tune the viscosity of the casting solution. As disclosed herein, the inventors have discovered that the addition of a high molecular weight PVP to the formulation of the film improves its compaction resistance. The addition of a small amount (0.1-15 wt %) of high molecular weight (360,000 Da) poly(vinylpyrrolidone) (PVP-K90) in the casting solution (relative to BCP) significantly improves the BCP film compaction resistance compared to films produced from neat ISV polymers. The inventors posit that these beneficial effects may be due to the PVP not only staying on the surface in the separation layer but also staying in the substructure and acting as a reinforcing agent that improves the stiffness of the film and therefore its compaction resistance. Another possibility is that the presence of PVP leads to delayed mixing during the immersion precipitation process thereby suppressing the formation of macrovoids and forming a spongy substructure with a dense separation layer. More notably, the addition of PVP maintains the highly ordered self-assembled selective separation layer of the film with an open macrovoid structure underneath supported on a woven/non-woven fabric. This result counters conventional knowledge in the art and is therefore a surprising result, as in theory, the probability of self-assembly getting disrupted is higher if the molecular weight of the additive is substantially higher than the molecular weight of the precursor polymer. Another surprising result is that the addition of a high molecular weight PVP tends to favorably decrease the viscosity of the casting solution, as opposed to what is documented in the literature. As shown in FIG. 1, the viscosity of solutions at the same wt % of ISV polymer shows a nearly 20% decrease in viscosity with the addition of 5% PVP-K90. Specifically, measurements taken at room temperature and as similar shear conditions, show that the ISV solution with no additive was measured at 1473 cP, while adding 5% PVP-K90 to the solution decrease the viscosity to 1180 cP. As disclosed herein, the flux decline (% loss as a function of time) of films casted from neat ISV polymers (i.e. ISV polymers without PVP) is in the range 60-70%, while that of films produced from casting solutions containing high molecular weight additives is 5-30%, depending on the type of solvent system. The protein adsorption of film with PVP is ~35% less compared to film from neat ISV polymer. This might be due to higher molecular weight additive getting entrapped in the polymer matrix and imparting hydrophilic character to the film. These films have excellent selectivity for proteins with ~3 fold difference in size. For example, only 56% of bovine serum albumin (7 nm) was rejected by the novel films disclosed, compared to 96% for thyroglobulin (20 nm). Additionally, the pore size of the BCP film can be tuned by changing the solvent system. For example, an ISV polymer film incorporating 5% PVP-K90 in dioxane/tetrahydrofuran solvent system showed a 47% increase in permeability, while the same film showed a 60% decrease in permeability under similar casting conditions in a dioxane/acetone solvent system. See FIG. 7D, discussed in further detail below. A method for forming an isoporous block copolymer (BCP) film comprises the steps of: formulating a polymer solution by mixing at least one block copolymer with at least one solvent and at least one high molecular weight hydrophilic polymer; forming the polymer solution into a film; evaporating a portion of the solvent(s); immersing the film into a coagulation bath; and optionally, rinsing the BCP film with water. The solvent for the polymer solution BCP film casting solution solvent comprises at least one of: Acetaldehyde, Acetic acid, Acetone, Acetonitrile, Benzene, Chloroform, Cyclohexane, Dichloromethane, Dimethoxyethane, Dimethyl sulfoxide, Dimethylacetamide, Dimethylformamide, 1,4-Dioxane, Ethanol, Ethyl acetate, Formic acid Hexane, Methanol, N-Methyl-2-pyrrolidone, Propanol Pyridine, Sulfolane, Tetrahydrofuran, or Toluene.

One embodiment of the aforementioned method may be performed as follows. The first step of the process is the creation of a composite structure. This process involves the formulation of a polymer solution comprising: (1) a block copolymer such as poly(isoprene-b-styrene-b-4-vinyl-pyridine) (ISV) (molar mass 50-500 kg/mol); (2) a solvent such as 1,4-dioxane and, optionally, tetrahydrofuran (THF) or acetone, onto a woven/non-woven microporous substrate such as polyester, thereby embedding a highly porous fabric into the liquid solution. It will be readily apparent to one of ordinary skill in the art that other known block copolymers may be substituted for the ISV polymer disclosed herein. The ISVs described herein have molecular weights as follows: ISV22: 94,000 Da; ISV28: 124,000 Da; ISV29: 91,000 Da; ISV43: 53,000 Da.

This step is followed by allowing the solvent in the extruded BCP film to evaporate (for 60-160 seconds). The BCP film is then immersed into a coagulation water bath, preferably at a temperature between 5° C. and 45° C. The solution coagulates and forms a solid separation layer through the well-known immersion precipitation process. The porous composite that results exhibits a thin, self-assembled isoporous top layer with pore sizes ranging from ~5-50 nm residing above a porous substructure. The porous composite formed results in ultrafiltration sized (approximately 5 to 25 nm) pores.

FIG. 1 shows a comparison of viscosities in BCP films formed with only ISV29 versus BCP films formed with ISV29 and 5% PVP-K90. Viscosity was calculated in centipoise (cP) and measurements were taken at room temperature under similar shear conditions. As shown in FIG. 1, the generic ISV29 film exhibited a viscosity of 1473 cP, while the ISV29 film with 5% PVP-K90 demonstrated a viscosity of 1180 cP, approximately 20% less. This decrease in viscosity upon addition of PVP-K90 is a surprising, favorable result that impacts the improved compaction resistance of the films of the present invention.

Figure 2B:
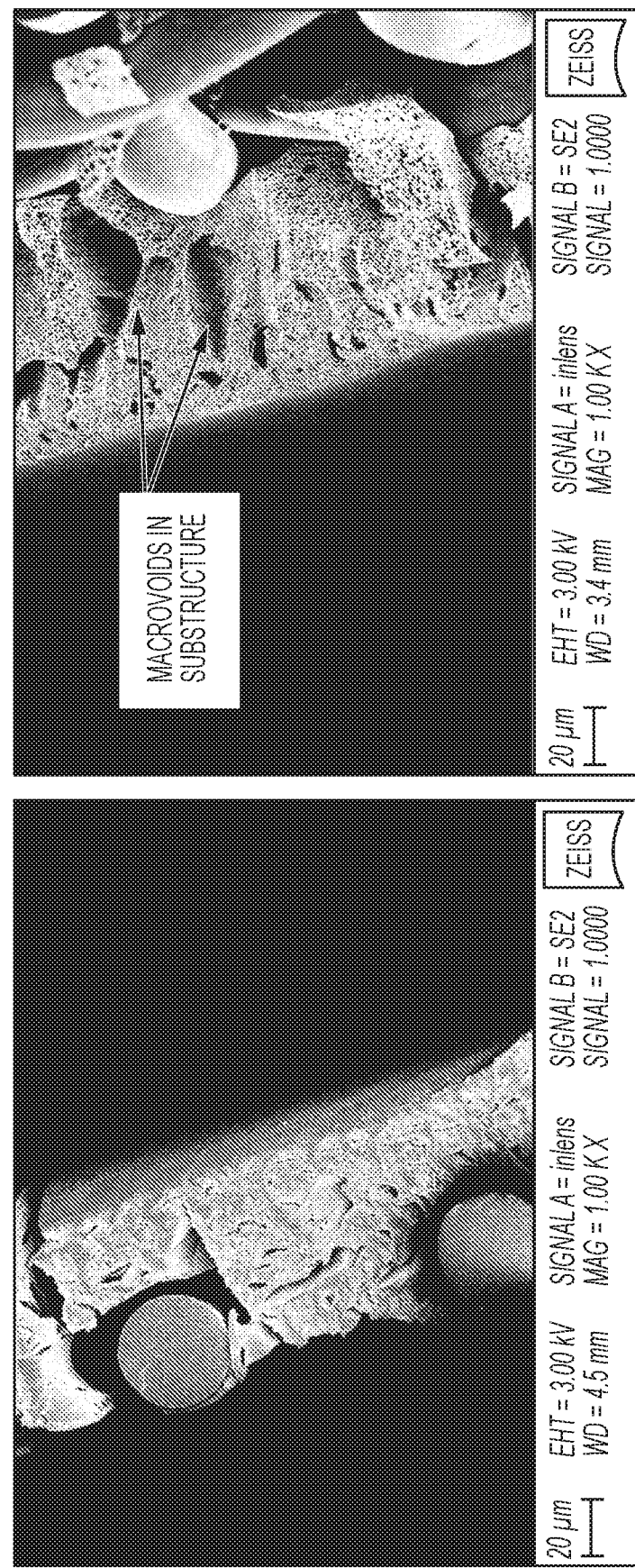

FIGS. 2A and 2B show preliminary research into the use of high molecular weight additives in the casting of BCP films. In addition to the use of PVP-K90 as disclosed in the subsequent figures and related disclosure, 30% PEG-150K (polyethylene glycol with an average molecular weight of 150,000 Da) was tested for use in neat ISV29 BCP films. As shown in FIG. 2A, the use of PEG-150K, while introducing defects in the film due to likely solubility issues, was successful in demonstrating that self-assembly of the film was unaffected by the introduction of the additive. More notably, as shown in FIG. 2B, microscopic analysis of the 30% PEG-150K ISV29 BCP film showed the presence of macrovoids in the substructure of the formed film, a favorable characteristic that was absent in the ISV29 BCP films without an additive.

Figure 3:
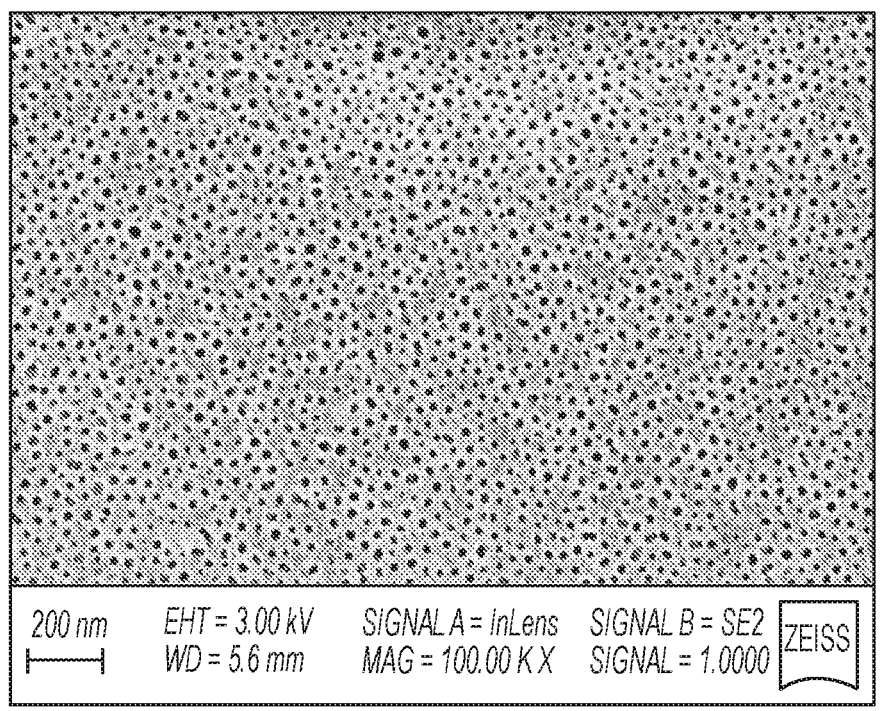
FIG. 3 shows top surface of ISV BCP films with and without the high molecular weight additive in different solvent systems.

FIG. 3 shows microscopic scans of the top surfaces of ISV BCP films with and without the high molecular weight additive in different solvent systems. The images show the surprising result that the self-assembly of the ISV BCP films was not disrupted after the addition of 5% PVP K90, in both the DOX/THF and DOX/Ace solvent solutions. Because the self-assembly of the films is not disrupted, the films form uniformly sized micelles in the casting solution, which in turn, provide a highly ordered isoporous structure on the films' surfaces. The highly ordered uniformly sized pores give a very sharp molecular weight cut-off and provide excellent selectivity for separating molecules of differing size.

Figure 4:
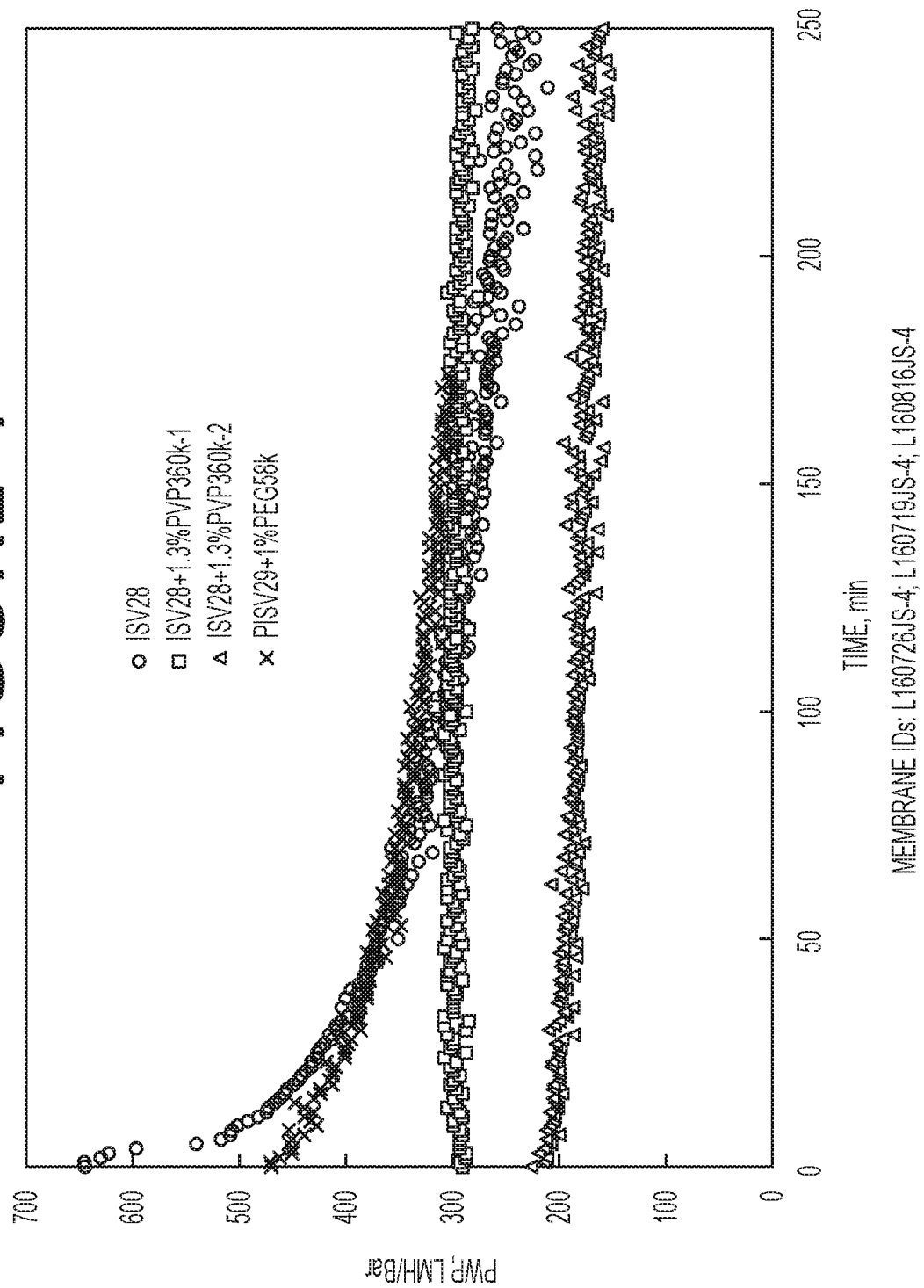
FIG. 4 shows the flux decline of ISV films disclosed by the present invention compared to neat ISV polymer films.

FIG. 4 shows the performance of films disclosed by the present invention compared to generic BCP films. In particular, FIG. 4 compares the performance of a "neat" ISV polymer film previously known in the art against novel ISV polymer films comprising poly(vinylpyrrolidone) ("PVP") and poly(ethylene glycol) ("PEG"). In the chart shown, four films are compared for their flux decline. Flux decline is used to measure the performance of a film, as a better-performing film will demonstrate a lesser decrease in flux over time. In FIG. 4, flux (pure water permeation) was measured as [(Liter/m$^2$/h)/bar g], commonly annotated as LMH/bar. This flux measurement of the films tested is shown on the y-axis of the chart. The x-axis is a measurement of time, in minutes. FIG. 4 thus shows how the flux of the film changes over time. The first film tested was ISV28, a poly(isoprene-b-styrene-b-4-vinyl-pyridine) film previously known in the art (a "neat" ISV polymer film), which does not incorporate any PVP. The second film tested was the ISV28 film with 1.3% PVP360K-1, poly(vinylpyrrolidone) with an average molecular weight of 360,000 Da. The third film tested was the ISV28 film with 1.3% PVP360K-2, polyvinylpyrrolidone) with an average molecular weight of 360,000 Da. The fourth film tested was the ISV29 film with 1% PEG58K, polyethylene glycol with an average molecular weight of 58,000 Da. Flux was then measured over 250 minutes.

The generic ISV film, the ISV28 BCP film, initially exhibited a flux of approximately 650 LMH/bar. However, over the 250-minute time period, the ISV28 film exhibited a flux decline to below 300 LMH/bar. This flux decline is primarily due to film compaction as the solution is passed through, and established the baseline against which the performance of the novel fabricated films could be compared. The second and third films tested represented ISV BCP films with a high molecular weight PVP incorporated. Unlike the ISV28 BCP film, the ISV28 film with 1.3% PVP360K-1 maintained a flux of approximately 300 LMH/bar, while the ISV28 film with 1.3% PVP360K-2 maintained a flux of approximately 200 LMH/bar across the 250-minute time interval. The fourth film tested, an ISV29 film with 1% PEG58K, exhibited a reduced flux decline over time to the ISV28 film, decreasing from an initial flux of approximately 480 LMH/bar to approximately 300 LMH/bar after 250 minutes. FIG. 4 is demonstrative of two points. First, that the incorporation of a high molecular weight PVP results in a surprising improvement in protecting the ISV film against flux decline due to compaction. Second, FIG. 4 shows that these surprising effects are particularly pronounced with high molecular weight PVP, as compared to the alternative high molecular weight additive, PEG.

FIG. 5 shows additional data, calculating the flux decline percentage of various fabricated films embodying the invention. In all of the tested films, an ISV BCP is used to form the film. The various embodiments then incorporate between 0.5% and 5% by weight of PVP-K90, a high molecular weight PVP with an average molecular weight of 360,000 Da. Various solvent systems were used in the embodiments, as disclosed in FIG. 3, including a 70:30 mix of dioxane and acetone (DOX/Ace), and a 70:30 mix of dioxane and tetrahydrofuran (DOX/THF).

Figure 6:
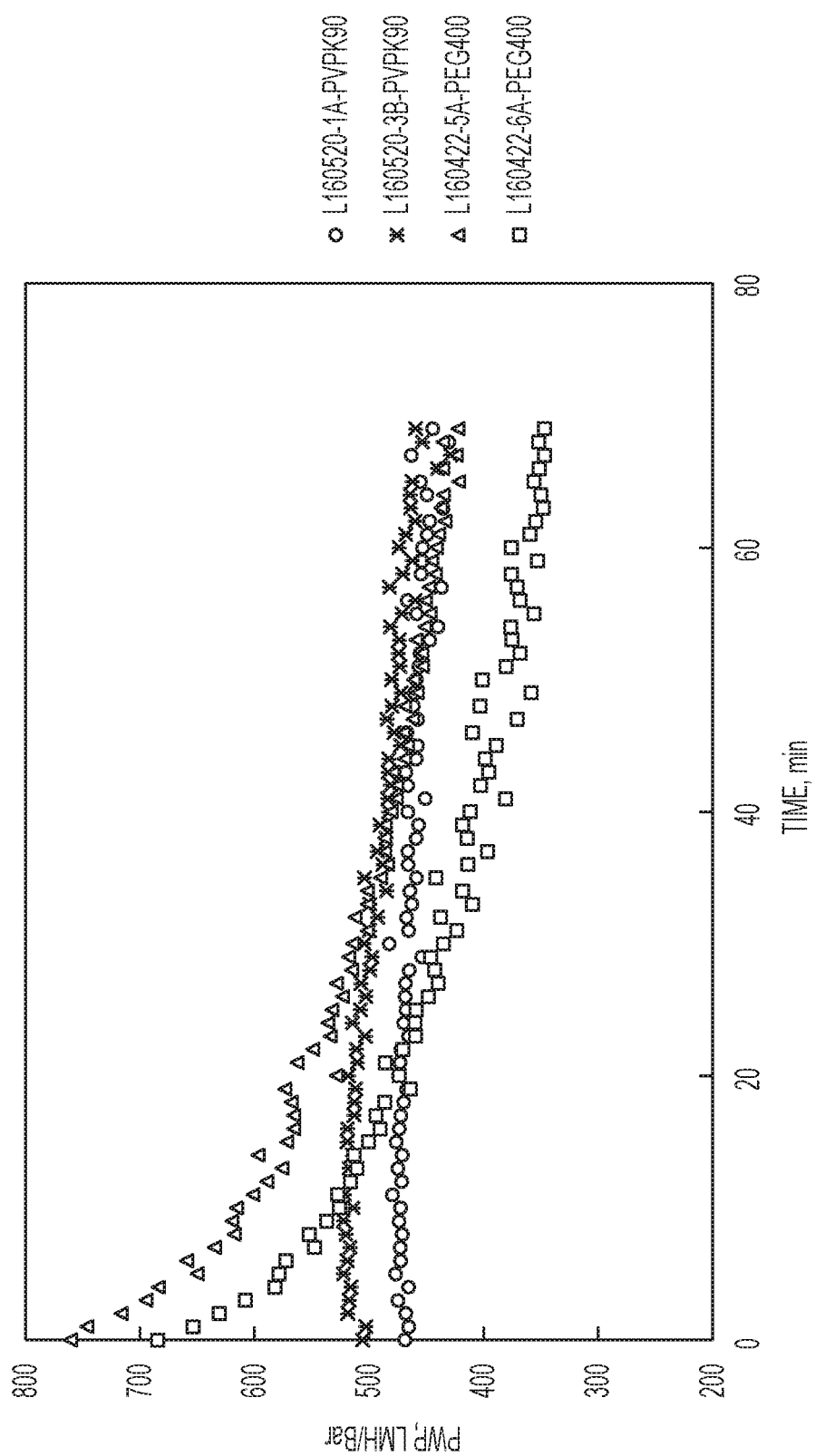
FIG. 6 shows a chart of the flux over a 70-minute time interval for four ISV22 BCP films incorporating either poly(vinylpyrrolidone) (PVP-K90) or a low molecular weight polyethylene glycol (PEG400)

In FIG. 6, a flux decline pattern was charted for some of the embodiments disclosed in FIG. 5 as well as ISV BCP with low-molecular weight PEG400 additive. Then, the percentage flux decline, indicative of the compaction resistance of the film was calculated as follows: (1−average of last 4 data points/average of first four data points)*100. FIG. 6 shows the flux decline over a 70-minute time interval for four ISV22 BCP films (Film IDs: L160520 and L160422) identical except for their incorporation of high molecular weight PVP K90 or low molecular weight PEG400. The film incorporating PVP-K90 exhibited significantly less flux decline than the films with small molecular weight PEG400.

In FIG. 6, the films incorporating PVP-K90 show a distinctly greater compaction resistance than those that incorporate PEG400. The film incorporating PEG400 and PEG400 start with initial fluxes of approximately 750 LMH/bar and 690 LMH/bar, respectively. After 70 minutes, their fluxes decrease markedly, to approximately 450 LMH/bar and 350 LMH/bar, or 40% and 49%, respectively. This decline in flux is indicative of limited compaction resistance. The decline in film flux of the ISV BCP films incorporating PEG is thus highly similar to those of ISV BCP films previously known in the art. By contrast, the ISV BCP films incorporating PVP-K90 demonstrate a strong compaction resistance over the measured time interval. The film incorporating 1A-PVP-K90 retained a flux of approximately 500 LMH/bar across the 70-minute time interval, while the film incorporating 3B-PVP-K90 retained its flux of approximately 480 LMH/bar for the duration of the time interval, demonstrating that the incorporation of PVP-K90 has a markedly positive effect on the compaction resistance of ISV BCP films. Together, FIGS. 5 and 6 show that the surprising compaction resistance of PVP-K90 incorporation in ISV BCP films is particularly significant when PVP-K90 is incorporated at between 0.5% and 5% by weight.

Figure 7A:
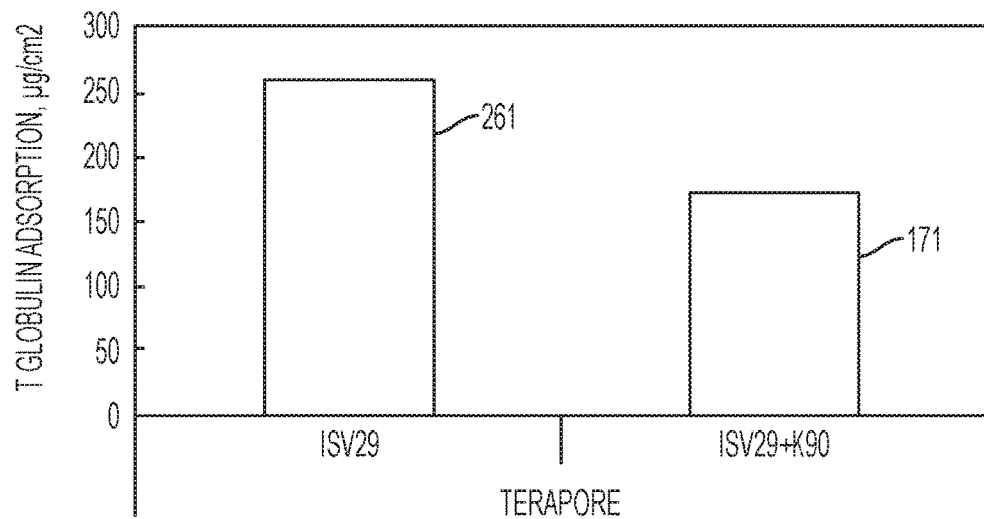
FIG. 7A shows protein adsorption of a neat polymer film compared to adsorption of the ISV29 BCP film incorporating PVP-K90.

The favorable characteristics of the novel films disclosed are not limited to compaction resistance. As shown in FIGS. 7A through 7D, the novel films disclosed exhibit a lesser degree of fouling, and demonstrate a high level of reproducibility in fabrication, such that the permeability of the film may be modulated to tune the pore size of the film based on the solvent systems used. FIG. 7A demonstrates the lesser degree of film fouling that occurs in the novel films of the present invention. The protein adsorption of a neat polymer film, ISV29, is compared to an embodiment of the present invention, the ISV29 BCP film, further incorporating PVP-K90 (Film ID L160729JS-2B). In the ISV29 film, IgG antibodies collected at an amount of 261 ug/cm$^2$ over the time interval, while only collecting at an amount of 171 ug/cm$^2$ over the same time interval on the film incorporating PVP-K90, thus demonstrating approximately 35% less adsorption (and film fouling).

Figure 7B:
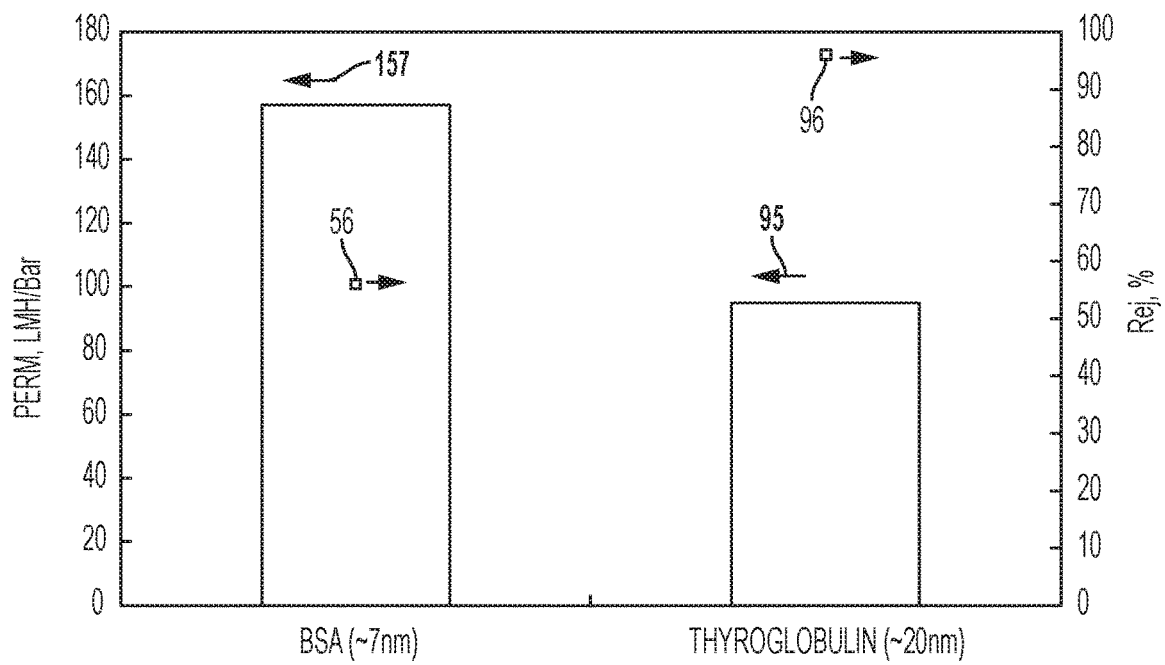

FIG. 7B demonstrates the high level of selectivity for permeation of particulate matter in the novel films of the present invention. The same fabricated film, an ISV28 BCP film incorporating 1.3% PVP-K90 was tested for permeability (LMH/bar) for BSA (~7 nm) and thyroglobin (~20 nm). Using that permeability, a rejection percentage for the BSA and thyroglobin were calculated. The film was tested first with BSA, cleaned with 0.1N NaOH, soaked in deionized water for more than 48 hours, and then tested with thyroglobin. As shown in FIG. 7B, the film showed a permeability of 157 LMH/bar for BSA and a rejection percentage of 56%. However, at the larger particle diameter, the film showed a permeability of only 95 LMH/bar for thyroglobin and a rejection percentage of 96%.

Figure 7C:
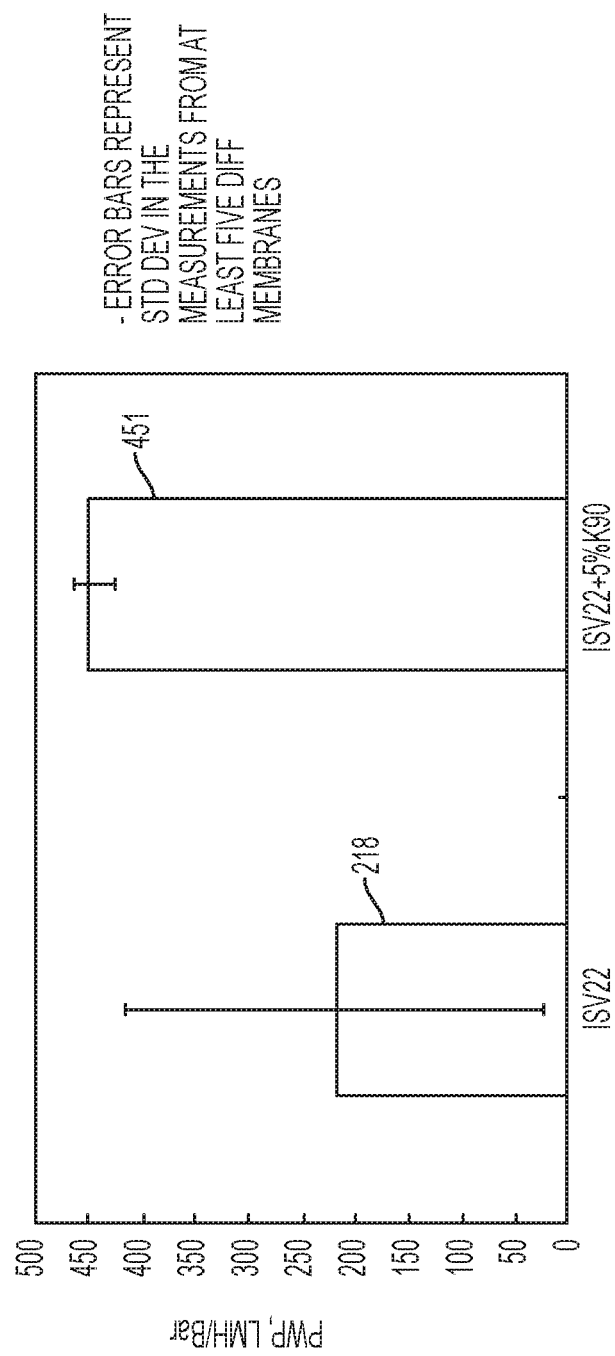
FIG. 7C is a chart showing the reproducibility of flux performance in BCP films of the present invention.

FIG. 7C provides a summary of the reproducibility of the methods and novel BCP films disclosed. PVP-K90 as an additive significantly improves the reproducibility of films cast from ISV polymers, with ISV films with no additive exhibiting pure water permeabilities averaged over five separate films of 218±195 LMH/bar and ISV films with 5% PVP-K90 exhibiting pure water permeabilities averaged over eight films of 451±24 LMH/bar. FIG. 7C thus demonstrates that reproducibility is superior in the BCP films of the present invention compared to those not containing a high molecular weight additive.

Figure 7D:
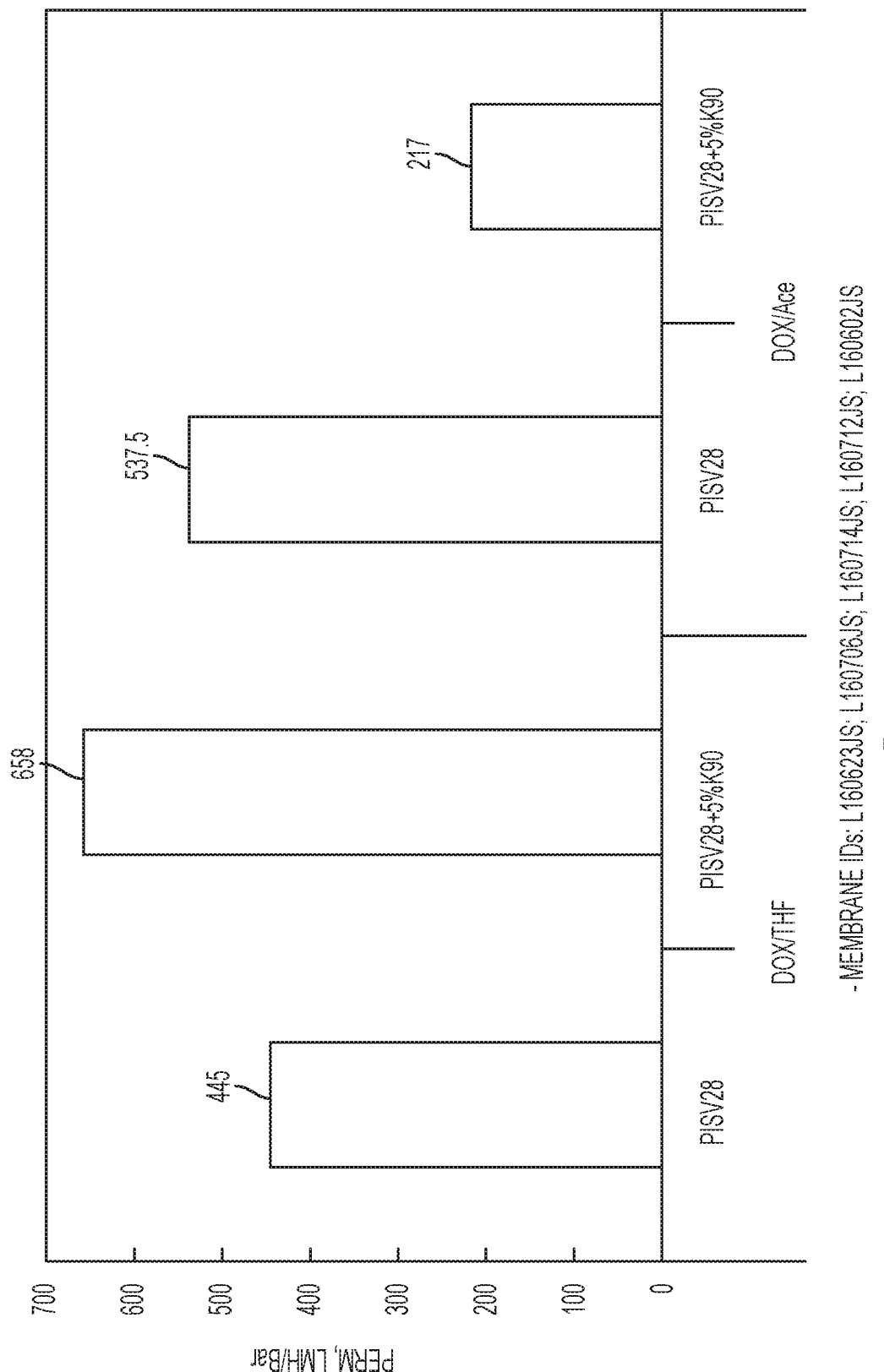
FIG. 7D shows the effect of solvent systems on permeability in BCP films incorporating PVP-K90.

FIG. 7D shows how the novel films incorporating PVP-K90 are affected by changes to the solvent system used during filtration. The neat ISV28 BCP film was compared to a ISV28 BCP film incorporating 5% PVP-K90. The permeability of the films was tested in DOX/THF (70/30) and DOX/Ace (70/30) solvent environments. While the ISV28 BCP film demonstrated a minor change in permeability, increasing from 445 LMH/bar to 537.5 LMH/bar, the ISV28 BCP film incorporating 5% PVP-K90 exhibited a marked decrease in permeability, from 658 LMH/bar to 217 LMH/bar. Because permeability is proportional to pore size, using those permeability measures in conjunction with known data such as that disclosed in FIG. 7B may be used to tune the pore size of films incorporating PVP-K90 based on the solvent system used.

Figure 8:
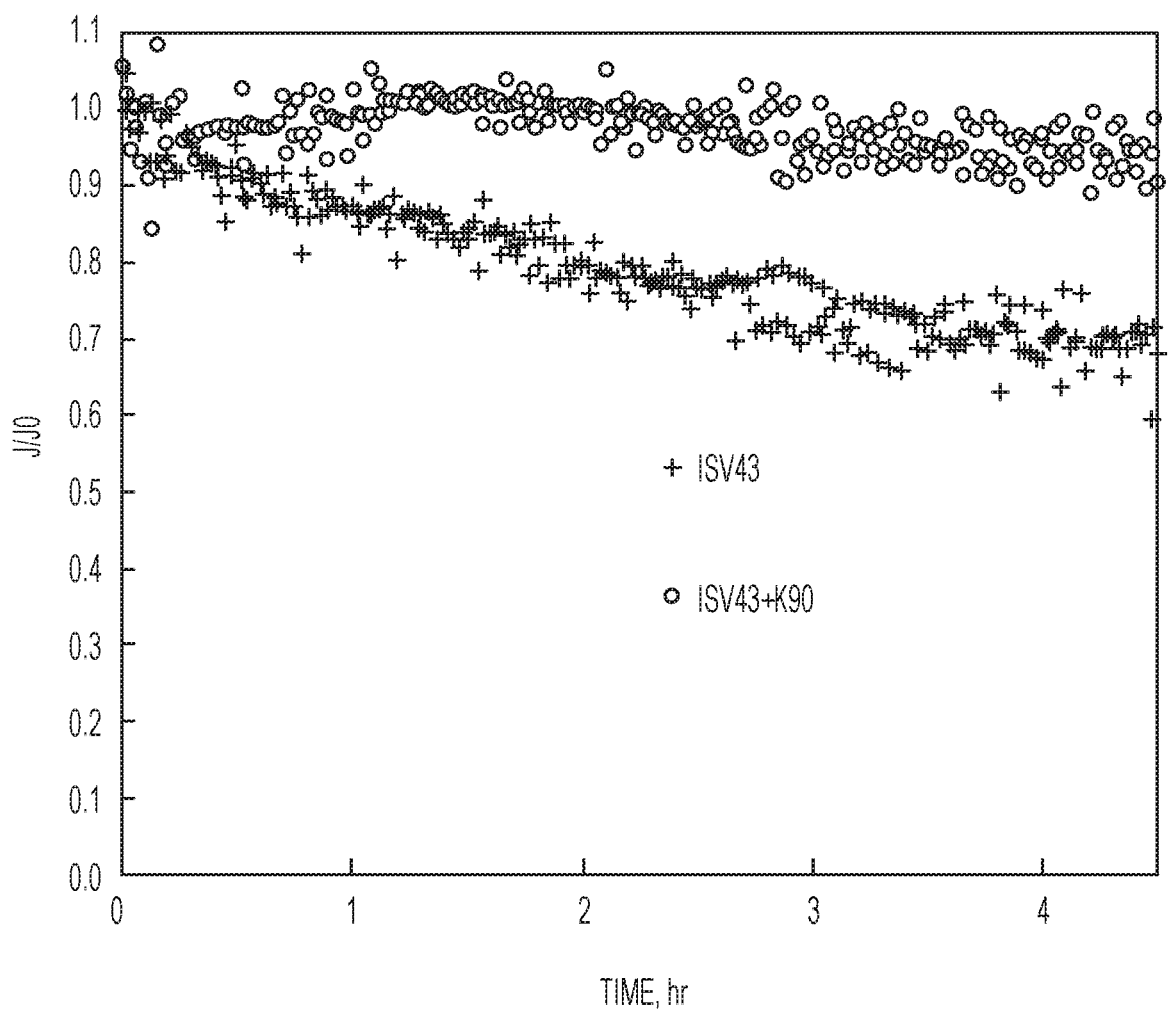
FIG. 8 is a chart of the flux retained ($J/J_0$) over a 270-minute (4.5 h) time interval for two ISV43 BCP films either with (white circles) or without (+ symbol) the PVP-K90 high molecular weight additive.

In FIG. 8, the films incorporating 5% (by mass) PVP-K90 relative to BCP show a distinctly greater compaction resistance than those without PVP-K90. The ISV43 film without PVP-K90 has an initial flux of approximately 202 LMH/bar. After 270 minutes, its flux decreases markedly, to approximately 135 LMH/bar, a 33% decline. This decline in flux is indicative of significant compaction. By contrast, the ISV43 BCP film incorporating PVP-K90 demonstrates a strong compaction resistance over the measured time interval. The film incorporating PVP-K90 retained a flux of approximately 267 LMH/bar across the 270-minute time interval, a decline of only 6%. The incorporation of PVP-K90 has a markedly positive effect on the compaction resistance of ISV BCP films.

Figure 9:
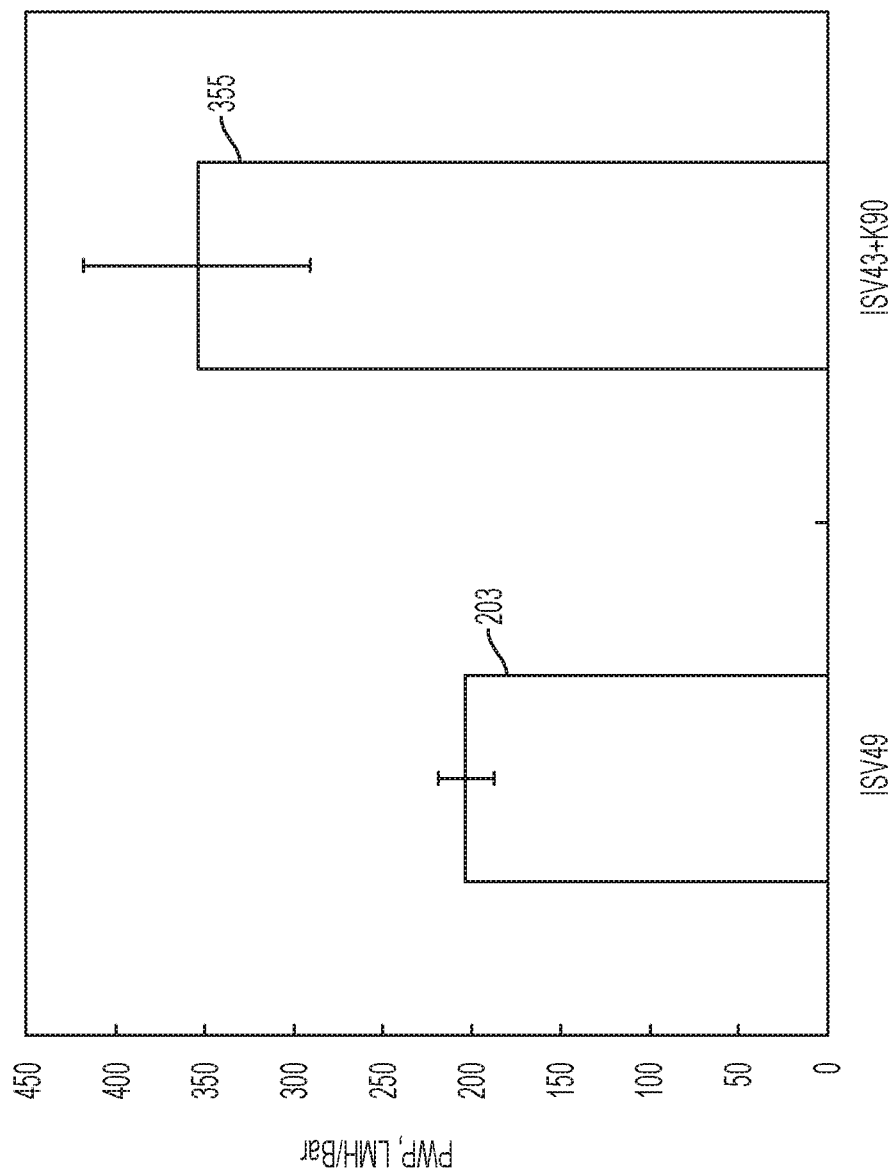
FIG. 9 is a chart showing the average pure water permeability (PWP) of six films each cast from a BCP ISV43, either without (left) PVP-K90 or with (right) PVP-K90 high molecular weight additive.

FIG. 9 is a chart demonstrating a flux increase of films through the inclusion of PVP-K90 in ISV43 BCP films. The average flux of six ISV43 films with no high molecular weight additive was 203±16 LMH/bar. The average flux of six ISV43 films with 5% (by mass) PVP-K90 relative to BCP was 355±59 LMH/bar, an 82% increase compared to the films without PVP-K90.

Exposure of films/membranes to glycerol solutions to prevent pore collapse (and thus loss of flux) upon drying is well known in the art. The ISV43 films with PVP-K90 retain more of their flux upon drying after exposure to a 1:1 (by mass) glycerol:water, compared to the ISV43 films without PVP-K90. The average flux of two undried ISV43 films without PVP-K90 had an average flux of 199 LMH/bar; the average flux of four ISV43 films without PVP-K90 dried after exposure to 1:1 glycerol:water was 168 LMH/bar, a flux retention of 85%. The average flux of two undried ISV43 films with PVP-K90 had an average flux of 279 LMH/bar; the average flux of four ISV43 films with PVP-K90 dried after exposure to 1:1 glycerol:water was 268 LMH/bar, a flux retention of 96%. This result shows the inclusion of the hydrophilic high molecular weight polymer increases the flux retention upon drying after exposure to a glycerol solution. This effect may be due to the hydrophilicity of the additive, which could aid the retention of glycerol. This effect, along with the flux increase and compaction resistance, demonstrates the unexpected benefits of the inclusion of the high molecular weight hydrophilic polymer additive in isoporous BCP films.

In some embodiments, the film is used in a separation or filtration application.

In some embodiments, the film is packaged as a syringe filter, capsule, cartridge, flat sheet, spiral wound, or hollow fiber.

In some embodiments, the block copolymer comprises a complex architecture. A complex architecture is defined as: possessing non-linear block arrangement, i.e., architecture with more than one chemistry/configuration/structure in or adjacent to at least one block.

Although this invention has been described in connection with specific forms and embodiments thereof, it will be appreciated that various modifications other than those discussed above may be resorted to without departing from the spirit or scope of the invention. For example, other high molecular weight additives could include a poly(acrylate), poly(methacrylate), poly(acrylic acid), poly(acrylamide), poly(vinylpyridine), poly(vinyl alcohol), poly(vinylpyrrolidone), naturally-derived polymers (including but not limited to cellulose, chitosan, complex carbohydrates), poly(ether), poly(maleic anhydride), poly(styrene sulfonate), poly(allylamine hydrochloride), poly(sulfone), poly(ethersulfone), poly(ethylene glycols), or substituted equivalent of the above. The high molecular weight additives could have a molecular weight of at least 50% block copolymer molecular weight. Moreover, other elements may be substituted for those specifically shown and described, certain features may be used independently of other features, and in certain cases, particular locations of elements may be reversed or interposed, all without departing from the spirit or scope of the invention as defined in the appended Claims.

What is claimed is:

1. A porous block copolymer (BCP) film, the BCP film comprising:
   a self-assembled block copolymer comprising:
   at least one hydrophilic block;
   at least one hydrophobic block; and
   a porous top separation layer and a porous substructure; and
   a high molecular weight poly(vinylpyrrolidone);
   wherein at least a portion of the pores of the BCP film are isoporous and mesoporous; and
   wherein the high molecular weight poly(vinylpyrrolidone) has a molecular weight equal to or greater than 50% of the molecular weight of the BCP.

2. The BCP film of claim 1, wherein the film is asymmetric.

3. The BCP film of claim 1, wherein the film exhibits a reduced flux decline over time compared to an identical BCP film with no high molecular weight poly(vinylpyrrolidone).

4. The BCP film of claim 1, wherein the film exhibits less than a 6% decline in flux over a 270 minute time interval.

5. The BCP film of claim 1, wherein the high molecular weight poly(vinylpyrrolidone) is present in the BCP film at a range of 0.1% to 15% by weight relative to the BCP.

6. The BCP film of claim 1, wherein the BCP film exhibits reduced protein adsorption compared to an identical BCP film with no high molecular weight poly(vinylpyrrolidone).

7. The BCP film of claim 1, wherein the film exhibits increased flux retention upon drying after exposure to a humectant solution.

8. A separation or filtration device comprising a BCP film according to claim 1.

9. The separation or filtration device of claim 8, wherein the separation or filtration device is in the form of a syringe filter, a capsule, a cartridge, a flat sheet, a spiral wound material, or a hollow fiber.

10. The BCP film of claim 1, wherein the self-assembled block copolymer is an AB diblock copolymer or an ABC triblock copolymer.

11. A method for forming an isoporous mesoporous block copolymer (BCP) film according to claim 1, the method comprising:
   (a) formulating a polymer solution by mixing a block copolymer with at least one solvent and a high molecular weight poly(vinylpyrrolidone);
   (b) forming the polymer solution into a film;
   (c) evaporating a portion of the at least one solvent from the film;
   (d) immersing the film into a coagulation bath to form the BCP film; and
   (e) optionally, rinsing the BCP film with water;
   wherein the high molecular weight poly(vinylpyrrolidone) has a molecular weight equal to or greater than 50% of the molecular weight of the BCP.

12. The method of claim 11, wherein the block copolymer comprises a hydrophilic block.

13. The method of claim 11, wherein the block copolymer has at least one block comprising: poly(butadiene), poly(isobutylene), poly(isoprene), poly(ethylene), poly(styrene), poly(methyl acrylate), poly(butyl methacrylate), poly(ethersulfone), poly(methyl methacrylate), poly(n-butyl acrylate), poly(2-hydroxyethyl methacrylate), poly(glycidyl methacrylate), poly(acrylic acid), poly(acrylamide), poly(sulfone), poly(vinylidene fluoride), poly(N,N-dimethylacrylamide), poly(2-poly(propylene glycol), poly(vinyl chloride), poly(tetrafluoroethylene), poly(ethylene oxide), vinylpyridine), poly(3-vinylpyridine), poly(4-vinylpyridine), poly(ethylene glycol), poly(propylene oxide), poly(N-isopropylacrylamide), poly(dimethylaminoethyl methacrylate), poly(amic acid), poly(dimethylsiloxane), poly(lactic acid), poly(isocyanate), poly(ethyl cyanoacrylate), poly(acrylonitrile), poly(hydroxystyrene), poly(methylstyrene), poly(ethyleneimine), poly(styrene sulfonate), poly(allylamine hydrochloride), poly(pentafluorostyrene, poly(2-(perfluorohexyl)ethy 1 methacrylate), or any substituted equivalent thereof.

14. The method of claim 11, wherein the at least one solvent comprises acetaldehyde, acetic acid, acetone, acetonitrile, benzene, chloroform, cyclohexane, dichloromethane, dimethoxyethane, dimethyl sulfoxide, dimethylacetamide, dimethylformamide, 1,4-Dioxane, ethanol, ethyl acetate, formic acid, hexane, methanol, N-Methyl-2-pyrrolidone, propanol, pyridine, sulfolane, tetrahydrofuran, or toluene.

15. The method of claim 11, wherein the BCP film is formed on a substrate.

16. The method of claim 11, wherein the high molecular weight poly(vinylpyrrolidone) is present in the polymer solution at a range of 0.1% to 15% by mass relative to the BCP.

17. The method of claim 16, wherein the high molecular weight poly(vinylpyrrolidone) is present in the BCP film at a range of 0.1% to 5% by weight relative to the BCP.

* * * * *